(12) United States Patent
Kumabe

(10) Patent No.: US 8,855,835 B2
(45) Date of Patent: Oct. 7, 2014

(54) CONVOY TRAVEL APPARATUS

(75) Inventor: Seigou Kumabe, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/614,079

(22) Filed: Sep. 13, 2012

(65) Prior Publication Data

US 2013/0079953 A1   Mar. 28, 2013

(30) Foreign Application Priority Data

Sep. 27, 2011   (JP) .................................. 2011-211071

(51) Int. Cl.
   *G05D 1/02* (2006.01)
   *G08G 1/00* (2006.01)

(52) U.S. Cl.
   CPC ................ *G08G 1/22* (2013.01); *G05D 1/0278* (2013.01); *G05D 1/024* (2013.01); *B60W 2550/408* (2013.01); *G05D 1/0295* (2013.01); *G05D 2201/0213* (2013.01)
   USPC .......................................................... 701/2

(58) Field of Classification Search
   CPC ............ B60W 10/00; B60W 2030/00; B60W 2300/00; B60W 2400/00; B60W 2550/408; G05D 1/278; G05D 1/293; G05D 1/24; G05D 1/295; G05D 2201/213; G08G 1/22
   USPC .......................................................... 701/2
   See application file for complete search history.

(56) References Cited

U.S. PATENT DOCUMENTS

| | | | |
|---|---|---|---|
| 5,331,561 A * | 7/1994 | Barrett et al. ................... | 701/23 |
| 6,928,123 B2 * | 8/2005 | Zehavi ......................... | 375/298 |
| 7,463,890 B2 * | 12/2008 | Herz et al. ..................... | 455/445 |
| 7,593,755 B2 * | 9/2009 | Colando et al. ................ | 455/566 |
| 8,014,828 B2 * | 9/2011 | Kraemer et al. ............. | 455/562.1 |
| 8,140,001 B2 * | 3/2012 | Haverty ............................. | 455/1 |
| 8,352,111 B2 * | 1/2013 | Mudalige ......................... | 701/24 |
| 8,352,112 B2 * | 1/2013 | Mudalige ......................... | 701/24 |
| 8,441,374 B2 * | 5/2013 | Yokoyama et al. ........... | 340/929 |

(Continued)

FOREIGN PATENT DOCUMENTS

| | | |
|---|---|---|
| JP | 2005-050187 | 2/2005 |
| JP | 2007-280060 | 10/2007 |
| JP | 2009-239585 | 10/2009 |

OTHER PUBLICATIONS

U.S. Appl. No. 13/614,005, Kumabe, filed Sep. 13, 2012.

(Continued)

*Primary Examiner* — Calvin Cheung
*Assistant Examiner* — Allen E Quillen
(74) *Attorney, Agent, or Firm* — Harness, Dickey & Pierce, PLC

(57) ABSTRACT

A convoy travel apparatus in a subject vehicle of a convoy transmits a convoy travel information, which includes the maximum allowable number and the currently-included number of vehicles in the convoy. The apparatus determines whether the subject vehicle is blocking a signal from a leader vehicle of the convoy in which the subject vehicle is traveling as a follower vehicle, where the signal being blocked by the subject vehicle may not reach a position of a rearmost vehicle in the convoy. When the subject vehicle is determined to be blocking the signal, the subject vehicle transmits the convoy travel information indicating that the subject vehicle as a leader vehicle (i.e., a representative leader vehicle) of the convoy, thereby enabling a newly-joining vehicle to receive the convoy travel information transmitted from the follower vehicle in the convoy.

9 Claims, 10 Drawing Sheets

(56) References Cited

U.S. PATENT DOCUMENTS

| | | | |
|---|---|---|---|
| 2006/0155427 A1* | 7/2006 | Yang | 701/1 |
| 2006/0165012 A1* | 7/2006 | Habetha | 370/254 |
| 2007/0093294 A1* | 4/2007 | Serafat et al. | 463/39 |
| 2009/0140887 A1* | 6/2009 | Breed et al. | 340/990 |
| 2009/0254392 A1* | 10/2009 | Zander | 705/7 |
| 2010/0094481 A1* | 4/2010 | Anderson | 701/1 |
| 2010/0256835 A1* | 10/2010 | Mudalige | 701/2 |
| 2010/0302956 A1* | 12/2010 | Haverty | 370/252 |
| 2010/0304706 A1* | 12/2010 | Haverty | 455/404.1 |
| 2011/0175753 A1* | 7/2011 | Free | 340/917 |
| 2011/0230269 A1* | 9/2011 | Serafat et al. | 463/42 |
| 2011/0282525 A1* | 11/2011 | Kraeling et al. | 701/19 |
| 2012/0095651 A1* | 4/2012 | Anderson | 701/50 |
| 2012/0213205 A1* | 8/2012 | Tammisetti | 370/332 |
| 2012/0315924 A1* | 12/2012 | Park et al. | 455/456.3 |
| 2013/0030606 A1* | 1/2013 | Mudalige et al. | 701/2 |
| 2013/0050244 A1* | 2/2013 | Kim | 345/589 |

OTHER PUBLICATIONS

U.S. Appl. No. 13/614,153, Kamabe, filed Sep. 13, 2012.

* cited by examiner

STATE B

CONVOY TRAVEL APPARATUS

CROSS REFERENCE TO RELATED APPLICATION

The present application is based on and claims the benefit of priority of Japanese Patent Application No. 2011-211071, filed on Sep. 27, 2011, the disclosure of which is incorporated herein by reference.

TECHNICAL FIELD

The present disclosure generally relates to an in-vehicle convoy travel apparatus performing a vehicle travel control to organize a convoy travel of vehicles.

BACKGROUND

In a convoy travel of multiple vehicles forming an organized group of vehicles, following vehicles (i.e., "followers") in a convoy, which follow a leader vehicle (i.e., a "leader"), respectively receive travel information directly from the leader vehicle for performing vehicle travel control and organizing a convoy. Such a technique is disclosed in, for example, Japanese Patent Laid-Open No. 2009-239585 (JP '585). According to such technique, the following vehicles other than an immediate following vehicle (i.e., a right behind vehicle) of the leader vehicle are also enabled to perform the travel control that quickly reflects the travel information of the leader vehicle.

When multiple following vehicles in the convoy respectively perform a vehicle travel control by directly receiving the travel information from the leader vehicle in the convoy, the following vehicles must stably receive high quality travel information of the leader vehicle. Therefore, the information transmitted by the leader vehicle of the convoy at a time of convoy travel of the vehicles may include information regarding the number of vehicles in the convoy (i.e., capacity information of the convoy, which indicates the current allowable number of vehicles that can be included in a convoy).

The capacity information may include the number of vehicles either as (i) actual numbers, i.e., the maximum number and the current number of the vehicles in the convoy, or as (ii) a calculated number, i.e., a difference between (ii-a) the current allowable number of vehicles that can be included in a convoy based on the communication capacity of a wireless communication unit in the leader vehicle and (ii-b) the currently-included number of vehicles currently included in the convoy.

By having the leader vehicle transmit information including the convoy capacity, the number of vehicles in the convoy is kept within a certain limit for allowing all convoy vehicles to stably receive the transmitted information from the leader vehicle. That is, in such manner, each vehicle in the convoy can securely receive the information from the leader vehicle.

However, even when the capacity information indicates that the convoy capacity still allows a new vehicle to join the convoy, the new vehicle may not be able to join the convoy in some cases. That is, for example, when one or more of the following vehicles already in the convoy are a large-size vehicle and such large-size vehicle blocks, or interrupts, the electric wave from the leader vehicle, the new vehicle cannot join the convoy.

In such case, because of the blockage/interruption of the electric wave from the leader vehicle by such large-size vehicle, the new vehicle cannot receive convoy travel information from the leader vehicle, thereby not allowed to join the convoy.

SUMMARY

In an aspect of the present disclosure, a convoy travel apparatus may be disposed in a subject vehicle and in other vehicles. The convoy travel apparatus, includes a control unit and wireless communication unit. The control unit generates a convoy travel information of the subject vehicle, which includes travel information of the subject vehicle, and performs a convoy travel control.

The wireless communication unit performs vehicle-to-vehicle communication between the subject vehicle and the other vehicles. The wireless communication unit regularly transmits the convoy travel information generated by the control unit and regularly receives the convoy travel information from the other vehicles.

The control unit may also determine whether the subject vehicle is a follower of a convoy or a leader of a convoy. When the control unit determines that the subject vehicle is the leader vehicle of the convoy, the control unit generates the convoy travel information to further include (i) leader information that allows a follower vehicle to determine that the subject vehicle is the leader vehicle, of the convoy and (ii) capacity information providing a current allowable number of vehicles of the convoy. When the control unit determines that the subject vehicle is the follower vehicle of the convoy, the control unit performs the convoy travel control of the subject vehicle per the convoy travel information received from a leader vehicle of the convoy to which the subject vehicle is the follower vehicle.

The control unit further determines whether the subject vehicle, which is first determined to be the follower vehicle of the convoy, is a wave blocker. That is whether the convoy is in a wave block state, where a wave blocker may be a vehicle that blocks a signal transmitted by the leader vehicle such that the convoy travel information from the leader vehicle is not reachable to a position of a rearmost vehicle in the convoy. The control unit may determine that the subject vehicle is a wave blocker when the convoy has space for a new vehicle, which may be determined by the current allowable number of vehicles and a convoy capacity provided in the convoy travel information from the leader vehicle.

When the subject vehicle is determined to be the wave blocker, the control unit designates the subject vehicle as a representative leader (or a "pseudo" leader vehicle) of the convoy and generates the convoy travel information of the subject vehicle to further include the leader information and the capacity information of the current allowable number of vehicles of the convoy. The capacity information may be information directly indicating the number of vehicles to be included in the convoy, or may be the information of (i) the maximum number of vehicles in the convoy and (ii) a currently-included number of vehicles in the convoy, as described later.

Accordingly, when the subject vehicle is the wave blocker, a new vehicle joining the convoy can receive the convoy travel information that is transmitted by a following vehicle in the convoy, which is pretending to be a leader vehicle (i.e., a representative leader). Further, since the convoy travel information received by the new vehicle includes the leader information and the capacity information, the new vehicle outside of the convoy can newly join the convoy to perform the convoy travel control even when the following vehicle blocking the electric wave from the leader vehicle exists.

In another aspect, the convoy travel apparatus may operate in a sub-convoy that is part of a whole convoy. That is, the sub-convoy is considered as a unit of convoy travel control for organizing a whole convoy.

The convoy travel information, which is generated by the control unit and transmitted by the wireless communication unit, includes a whole convoy ID representing a whole convoy and at least one sub-convoy ID representing a sub-convoy. The sub-convoy is organized by dividing the whole convoy, each sub-convoy including a number of vehicles less than or equal to a predetermined value defined by a communication capacity of the wireless communication unit of a sub-convoy leader vehicle.

The control unit of the convoy travel apparatus determines whether the subject vehicle is a follower vehicle in a sub-convoy or a sub-convoy leader vehicle of a sub-convoy. When the subject vehicle is the sub-convoy leader vehicle, the subject vehicle transmits the convoy travel information including (i) leader information that allows the follower vehicles of the sub-convoy to determine that the subject vehicle is the sub-convoy leader vehicle and (ii) capacity information regarding a current allowable number of vehicles of the sub-convoy.

On the other hand, when the subject vehicle is the follower vehicle, the subject vehicle performs the convoy travel control of the subject vehicle based on the convoy travel information received from the sub-convoy leader vehicle of the sub-convoy in which the subject vehicle is traveling as a follower vehicle. The control unit identifies the convoy travel information from the sub-convoy leader vehicle, from among many sets of the convoy travel information, by the sub-convoy ID and the leader information included therein.

Further, the control unit determines whether the subject vehicle, which is the follower vehicle of the sub-convoy, is a wave blocker. As provided above, the control unit may determine that the subject vehicle is a wave blocker when he convoy travel information from the sub-convoy leader vehicle, which includes the current allowable number of vehicles, indicates that the sub-convoy has space for a new vehicle. When the subject vehicle is determined to be the wave blocker, the control unit designates the subject vehicle as serving as a sub-convoy leader vehicle of a next sub-convoy, and generates the convoy travel information to further include a content of serving as the sub-convoy leader vehicle.

According to the above, the whole convoy ID and the sub-convoy ID is transmitted and used for the convoy travel control. The sub-convoy includes the number of vehicles, which is determined to be within a communication capacity of the wireless communication unit of the sub-convoy leader vehicle. Therefore, the follower vehicles in the sub-convoy are enabled to perform the convoy travel control by receiving the convoy travel information from the sub-convoy leader vehicle.

Even though the convoy can be organized with the number of vehicles exceeding the leader vehicle's communication capacity as described above, such an advantageous feature is not fully utilized for extending the length of the convoy when a follower vehicle in the convoy interrupts the electric wave from the convoy leader vehicle, thereby causing a restriction on the number of vehicles includable in the convoy.

As described above, the follower vehicles in the sub-convoy respectively determine whether the sub-convoy is in a wave blocked state, where the subject vehicle may be the wave blocker.

If it is determined that the sub-convoy is in the wave blocked state, the subject vehicle determines that it will serve as a sub-convoy leader vehicle of the next sub-convoy, and the subject vehicle controls the contents of the transmitted convoy travel information to include the contents from the sub-convoy leader vehicle. In such manner, a vehicle newly joining a convoy can receive the convoy travel information from a new sub-convoy leader vehicle. Therefore, a vehicle outside of the convoy can join the convoy and can perform the convoy travel control even when the sub-convoy includes a wave blocker vehicle, and the convoy length of the whole convoy can be increased.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The present disclosure is described in the following with reference to the drawings.

Figure 1:
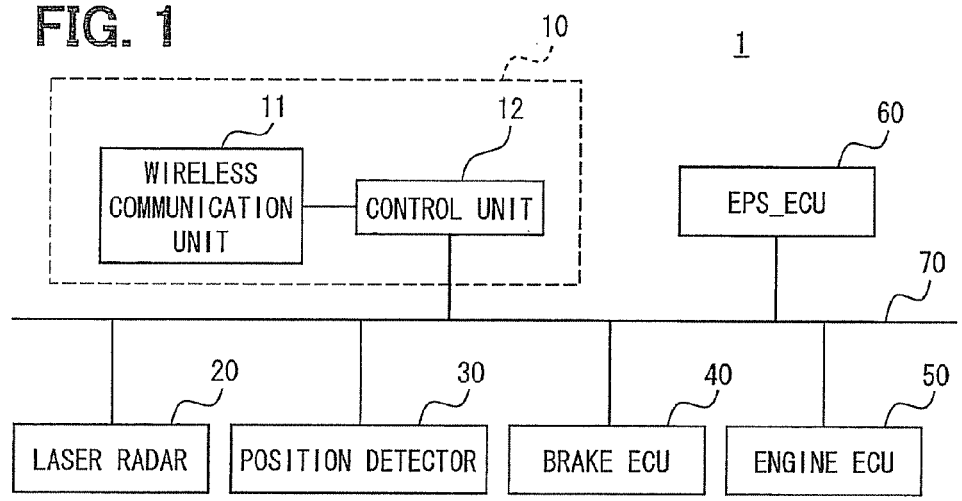
FIG. 1 is a block diagram of an in-vehicle convoy travel system including a convoy travel apparatus of the present disclosure.

FIG. 1 is a block diagram of an in-vehicle convoy travel system 1 including a convoy travel apparatus 10. The in-vehicle convoy travel system 1 is disposed in a subject vehicle, and where multiple vehicles each having the in-vehicle convoy travel system 1 organize a convey of travel vehicles with the in-vehicle convoy travel system 1 (i.e., a travel of many vehicles organized as a convoy).

In addition to the convoy travel apparatus 10, the in-vehicle convoy travel system 1 includes a laser radar 20, a position detector 30, a brake ECU 40, an engine ECU 50, and an EPS_ECU 60, which are communicably coupled via a local area network (LAN) 70 based on a communication protocol such as a Controller Area Network (CAN).

The convoy travel apparatus 10 includes a wireless communication unit 11 and a control unit 12. The wireless communication unit 11 has a transmission and reception antenna (not illustrated), and, for example, wirelessly performs a vehicle-to-vehicle communication in a communication range of, for example, several hundred meters around the subject vehicle. Further, the electric wave used by the wireless communication unit 11 may be in a 700 MHz band. However, the wireless communication unit 11 may use other frequency bands such as 5.9 GHz. Further, information from the subject vehicle is broadcasted through a unidirectional communication (i.e., one-way communication).

The control unit 12 includes a well-known CPU and memories, such as ROM, RAM, EEPROM, as well as an input/output and a bus line (not illustrated) to coupled the components of the control unit 12. The control unit 12 performs a convoy travel control by controlling the brake ECU 40, the engine ECU 50, and the EPS_ECU 60, based on information acquired from other vehicles through the wireless communication unit 11 and based on information acquired from the laser radar 20, the position detector 30, the brake ECU 40, the engine ECU 50, and the EPS_ECU 60 via the in-vehicle LAN 70 of the subject vehicle.

Further, the control unit 12 functions as a communication controller by controlling transmission and reception of information transmitted and received by the wireless communication unit 11. Under control of the control unit 12, the wireless communication unit 11 transmits convoy travel information, i.e., information of the subject vehicle, which is used respectively by other vehicles in the convoy for the convoy travel control of the vehicles. Furthermore, the control unit 12 performs a process that identifies a sender of the convoy travel information received by the wireless communication unit 11. Details of such process by the control unit 12 are described later.

The laser radar 20 is installed on a front end of the vehicle, and scans a front object in front of the vehicle by emitting a laser beam in a comparatively small predetermined angle range. The front object is detected based on an intensity of a reflection beam from the front object (i.e., the reflection beam is the laser beam reflected off of the front object) that is above a predetermined level. Based on the emission direction of the laser beam, a relative direction of the front object is detected, and, based on the time between the emission and the reception of the laser beam, the distance to the front object is also detected. The laser radar 20 performs a determination whether the front object is a forward vehicle that travels right in front of the subject vehicle (i.e., immediately ahead or a right ahead vehicle). Therefore, the laser radar 20 can regularly measure a distance from the subject vehicle to the forward vehicle. Further, the laser radar 20 may be replaced with a millimeter wave radar. Further, the control unit 12, instead of the laser radar 20, may perform a determination whether the front object is a forward vehicle of the subject vehicle.

The position detector 30 includes a Global Positioning System (GPS) receiver receiving the electric wave from a satellite of GPS, and regularly detects coordinates (i.e., GPS positioning coordinates hereinafter) of a position of the subject vehicle based on the electric wave received by the GPS receiver.

The brake ECU 40 uses a microcomputer as its main component, which includes CPU, ROM, RAM, backup RAM and the like, and acquires, for example, a signal indicating a vehicle speed, a forward/backward acceleration, and a lateral acceleration from a vehicle speed sensor and an acceleration sensor, and supplies the signal to the control unit 12. Further, based on instructions from the control unit 12, the brake ECU 40 controls brake actuators to control a vehicle speed (e.g., reduce vehicle speed).

The engine ECU 50 controls an engine torque generated by an engine (not illustrated) to accelerate and decelerate the subject vehicle based on instructions from the control unit 12. The EPS_ECU 60 acquires a signal indicating a steering torque and a steering angle from a torque sensor and a steering angle sensor, and supplies those signals to the control unit 12. Based on instructions from the control unit 12, the EPS_ECU 60 controls a motor that rotates a steering shaft of the subject vehicle.

The convoy travel control performed by the control unit 12 is described in detail. First, explanation of a basic concept of the convoy travel control in the present embodiment is provided with reference to FIG. 2. The convoy travel control in the present embodiment is performed according to four states of the subject vehicle: an initial state (State A), a convoy ready state (State B), a convoy enabling state (State C), and a convoy travel state (State D). The control unit 12 changes and keeps track of a state parameter that represents one of four states of the subject vehicle.

The processes performed in the four states are described in the following. Each vehicle, i.e., the subject vehicle and other vehicles, starts with the initial state (State A). Further, the vehicle (i.e., a control state of a vehicle) may transition to the initial state (State A) from each of the other states, that is, from the convoy ready state (State B), the convoy enabling state (State C), and the convoy travel state (State D).

Figure 3:
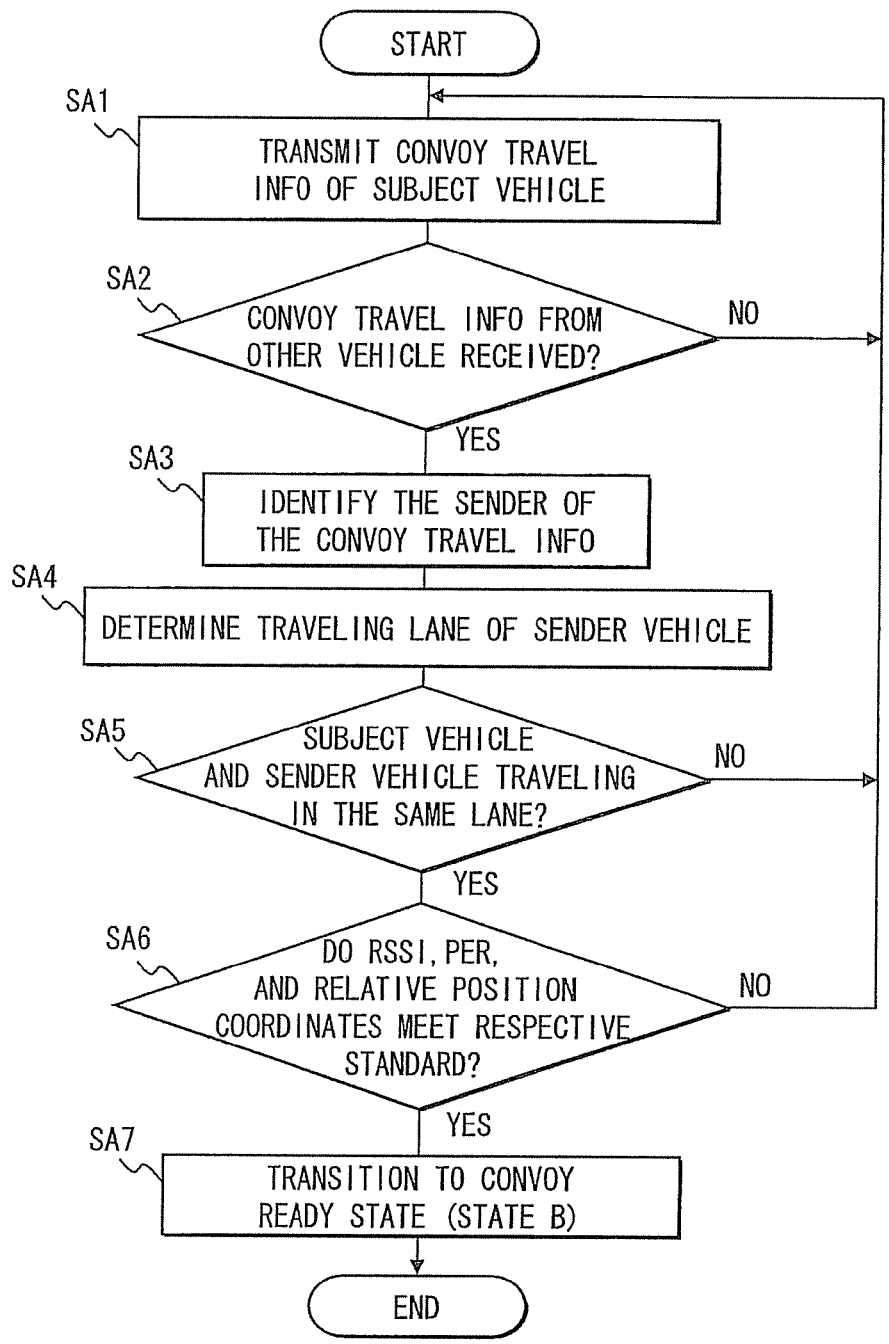
FIG. 3 is a flowchart of a process performed in an initial state (State A) by the convoy travel apparatus.

When the subject vehicle is in the initial state (State A), it performs a process shown in FIG. 3. The subject vehicle, in SA1, transmits a convoy travel information of the subject vehicle from the wireless communication unit 11. The convoy travel information includes a predetermined number, such as four latest measurements of successively observed GPS positioning coordinates, as well as, vehicle speed and travel direction. Further, the convoy travel information may include information of the travel control and/or travel behaviors of the subject vehicle (e.g., information about the brake control). The GPS positioning coordinates are regularly acquired from the position detector 30, and the vehicle speed is acquired from the vehicle speed sensor through the brake ECU 40. The direction may be calculated from the locus of GPS positioning coordinates, or may be acquired from a geomagnetism sensor if the subject vehicle is equipped with one.

Though not included in the convoy travel information of the initial state (State A), the convoy travel information of the convoy travel state (State D) may include a whole convoy ID and a sub-convoy ID, as described later, and the convoy travel information may further include a currently-included number of vehicles and the maximum number of vehicles in the convoy.

In SA2, the process determines whether convoy travel information from another vehicle has been received. If one or more vehicles around the subject vehicle are equipped with the in-vehicle convoy travel system 1, the subject vehicle receives the convoy travel information from such vehicles (i.e., other vehicles) because those vehicles can transmit the convoy travel information. If convoy travel information was not received from the other vehicle (SA2, No) the process returns to SA1. If convoy travel information was received (SA2,YES), the process proceeds to SA3. The other vehicle that transmitted the convoy travel information received by the subject vehicle is referred to as a sender vehicle hereinafter.

In SA3, the process identifies the sender vehicle that transmitted the convoy travel information received in SA2. Specifically, the process generates a travel locus of the sender vehicle from multiple measurements of GPS positioning coordinates included in the convoy travel information from the sender vehicle. The process then compares the generated travel locus with a past travel locus generated from the convoy travel information that was previously received prior to the reception of the convoy travel information currently received and is stored in memory. Based on the matching degree of two travel loci, the process identifies the sender vehicle of the convoy travel information currently-received.

Further, when performing a convoy travel, convoy travel information is received from each of the multiple vehicles regularly. From among all the convoy travel information received, the past travel locus used in the above comparison has at least one measurement time that is the same as the GPS positioning coordinates as the current travel locus. That is, the current travel locus and the past travel locus are chosen to have substantially the same measurement time except for the end point of the travel locus. Such situation is described in detail in the following.

Figure 4:
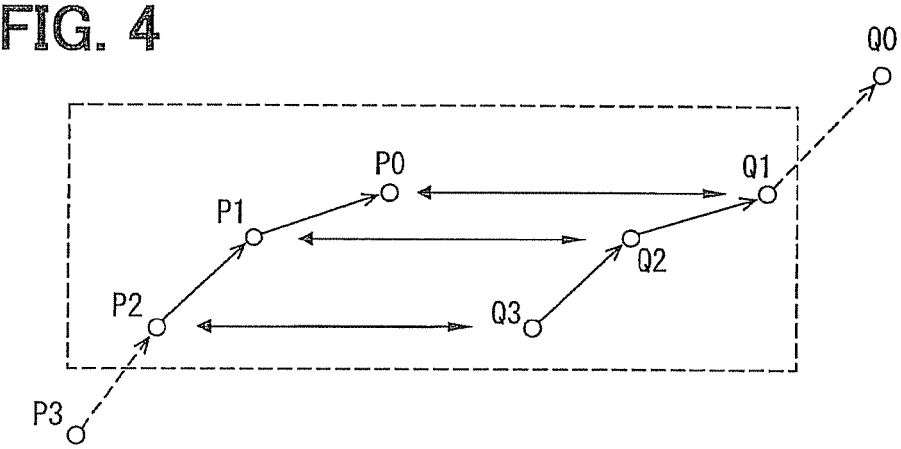
FIG. 4 is an illustration of a comparison method of travel loci of two vehicles.

With reference to FIG. 4, the comparison method of two travel loci respectively having four measurement points is described in the following. The past travel locus used for comparison is made up from three points, excluding the oldest measurement point from the four successively measured points. The three GPS positioning coordinate points used for comparison are P2, P1, P0. The current travel locus used for comparison is also made up from three points, the GPS positioning coordinate points of Q3, Q2, Q1 of FIG. 4, excluding the latest measurement point. If the GPS positioning coordinate points P0 to P3 and Q0 to Q3 are based on the information successively transmitted from the same vehicle, the points P0 and Q1, the points P1 and Q2, the points P2 and Q3 respectively represent the same GPS positioning coordinate points of the same vehicle measured respectively at the same time, as indicated by both-headed arrows in FIG. 4. Therefore, as circled by a dotted line square in FIG. 4, a travel locus P2-P1-P0 and a travel locus Q3-Q2-Q1 substantially match with each other if they are from the same vehicle. If, on the other hand, two loci are from different vehicles, the matching degree of two loci is less.

Therefore, based on the matching degree of two travel loci, the position of the sender vehicle of the convoy travel information currently-received can be identified. The matching degree mentioned above represents both of the degree of matching of two travel locus shapes as well as the degree of matching of two travel locus positions. Therefore, by regularly identifying the sender vehicle based on the travel locus, the sender vehicle transmitting the convoy travel information is identified in terms of its whereabouts in the past (i.e., its travel locus history), even when the latest GPS positioning coordinate points respectively received from the multiple vehicles around the subject vehicle are very close to each other (i.e., even when one travel locus and the other are very similar at one measurement points or another). Further, when it is determined that the degree of matching of a travel locus with any one of the past travel loci is below a certain level, such vehicle is determined as a newly-joining vehicle just recently coming into the communication area of the subject vehicle.

With continuing reference to FIG. 3, in SA4, based on the GPS positioning coordinates of both vehicles and independent sensor information, the process determines whether the sender vehicle identified in SA3 is traveling in the same lane as the subject vehicle. For instance, when it is determined (i) that the sender vehicle is in front of the subject vehicle at or within a predetermined distance based on the GPS positioning coordinates and (ii) based on the detection of the laser radar 20 it is determined that a vehicle, substantially within the predetermined distance, is right-ahead of or immediately ahead of the subject vehicle, the subject vehicle and the sender vehicle are determined to be traveling in the same lane.

When the determination in SA4 is that the subject vehicle and the sender vehicle are traveling in the same lane, SA5 is YES and the process proceeds to SA6. Otherwise SA5 is NO, and the process returns to SA1.

In SA6, the process determines whether a reception signal strength (RSSI) and packet error rate (PER) of the convoy travel information received in SA2 from the sender vehicle respectively satisfy a certain standard for each of those indices. Specifically, when the RSSI is greater than a RSSI threshold, it is determined to satisfy the standard, and, when the PER is less-than or equal to a PER threshold, it is determined to satisfy the standard. It is preferred to have a higher RSSI and a lower PER.

The process also determines whether relative position coordinates satisfy a certain standard. The relative position coordinates are calculated as coordinate differences between the latest positions of the subject vehicle and the sender vehicle. When a distance represented by the coordinate differences is equal to or under a threshold standard distance, the relative position coordinates are determined as satisfying the standard.

If the RSSI, the PER, and the relative position coordinates satisfy respective standards, the process in SA6 is determined as affirmative, which indicates that a vehicle close to the subject vehicle is transmitting the convoy travel information, and the information transmitted from the vehicle is received in a high reception quality.

When the process in SA6 is determined as affirmative, the process proceeds to SA7. On the other hand, when the process in SA6 is determined as negative, that is, when at least one of the RSSI, the PER, and the relative position coordinates is not a standard, the process returns to SA1.

Figure 5:
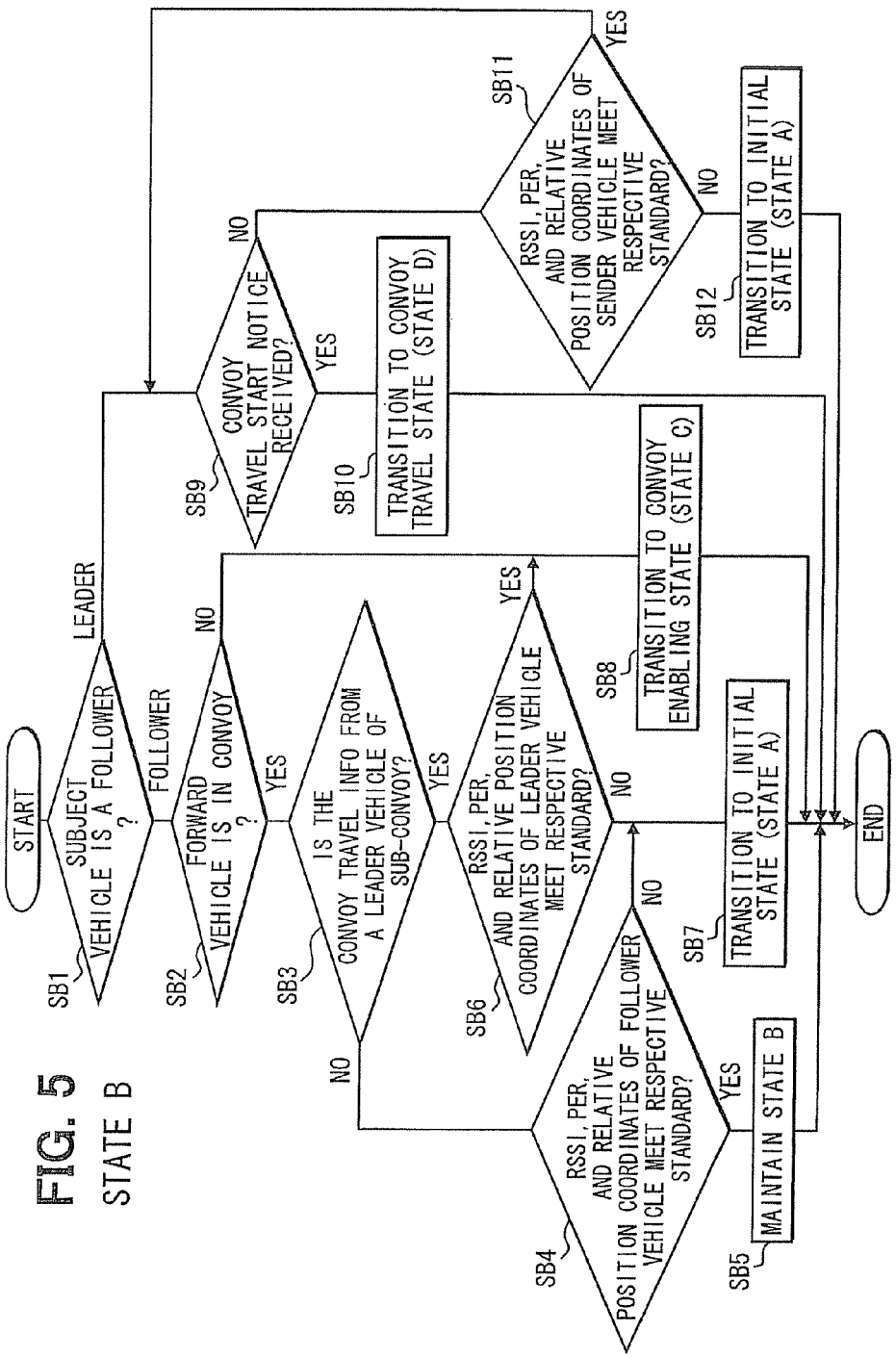
FIG. 5 is a flowchart of a process performed in a convoy ready state (State B) by the convoy travel apparatus.

In SA7, the state parameter is changed to the convoy ready state (State B). After transiting to the convoy ready state (State B) by the execution of SA7, a process shown in FIG. 5 is performed.

Figure 2:
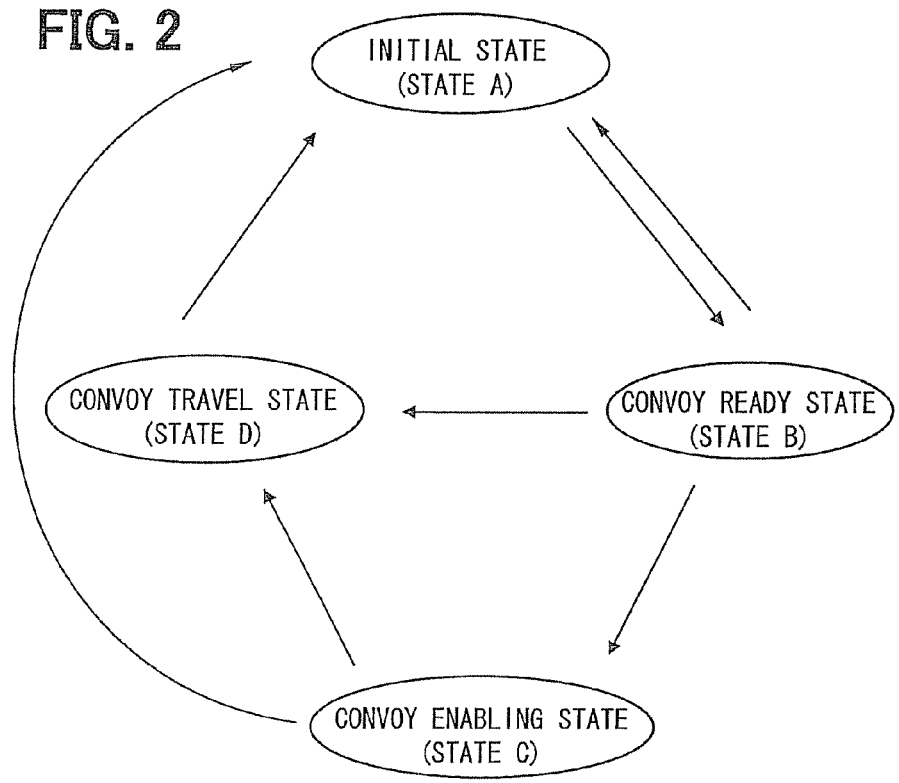
FIG. 2 is a state transition diagram of convoy travel control.

The process executed in the convoy ready state (State B) is described with reference to FIG. 5. The subject vehicle can transition to the convoy ready state (State B) only from the initial state (State A) as shown in FIG. 2, and, when the subject vehicle transitions from the initial state (State A) to the convoy ready state (State B), the subject vehicle should not be in any convoy and the subject vehicle, which is joining a convoy, has identified at least one sender vehicle. The subject vehicle may be referred to as the joining vehicle hereinafter.

A convoy can be organized by the joining vehicle and the sender vehicle in either case that the joining vehicle leads (i.e., is in front of) the sender vehicle or the sender vehicle leads the joining vehicle. Therefore, whether to transition from the initial state (State A) to the convoy ready state (State B) is determined without identifying which one of the joining vehicle and the sender vehicle is in front of the other. However, the process of organizing a convoy is respectively different when the joining vehicle leads the sender vehicle and when the sender vehicle leads the joining vehicle.

Therefore, in SB1, the process determines whether the joining vehicle (i.e., the subject vehicle) is following the sender vehicle. Such determination is performed based on the latest GPS positioning coordinates of the joining vehicle and the GPS positioning coordinates of the sender vehicle, which are included in the convoy travel information received from the sender vehicle.

When the GPS positioning coordinates of the joining vehicle are behind the travel direction of the GPS positioning coordinates of the sender vehicle, it is determined that the joining vehicle is following the sender vehicle (i.e., the subject vehicle will be traveling as a follower vehicle in the convoy, where "follower vehicle" may also be referred to as a "following vehicle"), and the process proceeds to SB2.

When the GPS positioning coordinates of the joining vehicle are in front of the travel direction of the GPS positioning coordinates of the sender vehicle, it is determined the joining vehicle will become a leader vehicle in a convoy, and the process proceeds to SB9.

When the subject vehicle (i.e., the joining vehicle) is a follower vehicle of the sender vehicle, the process in SB2, determines whether the sender vehicle (i.e., a forward vehicle in the following) is traveling in a convoy. The convoy travel information from the forward vehicle may include a whole convoy ID. Based on the inclusion of such ID in the convoy travel information, the determination in SB2 is performed. Thus, if the convoy travel information of the forward vehicle includes the whole convoy ID, the forward vehicle is in a convoy (SB2, YES), and the process proceeds to SB3, and if the convoy travel information does not include the whole convoy ID, the forward vehicle is not in a convoy (SB2, NO), and the process proceeds to SB8.

When SB3 is performed, the forward vehicle is provided as a rearmost vehicle traveling in the convoy. In the present embodiment, the convoy is organized by not only using the behavior of a right ahead vehicle (i.e., a vehicle traveling immediately in front of the subject vehicle) but also using the information transmitted by a sub-convoy leader vehicle (i.e., a leader of the sub-convoy). Therefore, in SB3, it is determined whether the convoy travel information is received from a leader vehicle of the sub-convoy.

In the present embodiment, contents of the convoy travel information from a leader vehicle of the sub-convoy and a follower vehicle in the sub-convoy provide respectively different information. For instance, the convoy travel information from the leader vehicle of the sub-convoy includes the maximum allowable number of vehicles in the convoy and the currently-included number of vehicles in the convoy. Therefore, whether the convoy travel information is from the leader vehicle of the sub-convoy is determined based on the inclusion of such information (i.e., the maximum allowable number and the currently-included number of vehicles) in the convoy travel information. Accordingly if the convoy travel information includes the maximum allowable number and the currently-included number of vehicles, the convoy travel information is from the leader vehicle (S3: Yes), and the process proceeds to SB6. If such information is not included, the convoy travel information is not from the leader (SB3, NO), but from a follower vehicle in the sub-convoy and the process proceeds to SB4.

In SB4, the process determines whether the RSSI, the PER, and the relative position coordinates from the follower vehicle of the sub-convoy satisfy the respective standards. Such determination is performed for the purpose of determining whether to further maintain the convoy ready state (State B).

When all of the RSSI, the PER, and the relative position coordinates satisfy the standards (SB4, YES), the process proceeds to SB5. Then, in SB5, it is determined to further maintain the convoy ready state (State B). In such case of further maintaining the convoy, the process thereafter returns to SB1. On the other hand, if at least one of the RSSI, the PER, and the relative position coordinates do not satisfy the standards (SB4, NO) the process proceeds to SB7.

When the convoy travel information is from the leader (SB3, YES), the process proceeds to SB6 and determines whether the RSSI, the PER, and the relative position coordinates in the convoy travel information from the leader vehicle of the sub-convoy satisfy the respective standards. If the RSSI, the PER, and the relative position coordinates satisfy the respective standards (SB6, YES), the process proceeds to SB8, and if no (SB6, NO), the process proceeds to SB7.

In SB7, the state parameter is changed to the initial state (State A). In such case, the process in FIG. 3 is performed.

In SB8, the process changes the state parameter to the convoy enabling state (State C). The state parameter is changed to the convoy enabling state (State C) when the subject vehicle is a follower vehicle of the sender vehicle (i.e., forward vehicle). If the forward vehicle of the subject vehicle is traveling in a convoy, the state parameter is changed to the convoy enabling state (State C) only when the convoy travel information from the leader vehicle of the sub-convoy is received in a high reception quality. The convoy enabling state (State C) is provided in FIG. 6.

When the process in SB1 determines that the subject vehicle is a leader vehicle in SB1, then, in SB9, the process determines whether a convoy travel start notice has been received from a following vehicle (i.e., a follower vehicle). The convoy travel start notice is a notice sent by the following vehicle in SC7 of FIG. 6 indicating that the following vehicle is following the subject vehicle (i.e., forward vehicle) and has started the convoy travel. When it is determined to have received the convoy travel start notice, the process proceeds to SB10.

In SB10, the process changes the state parameter to the convoy travel state (State D) indicating that the subject vehicle is traveling in a convoy. In other words, when the subject vehicle is a leader vehicle of a convoy and receives the convoy travel start notice from a following vehicle, the subject vehicle transitions to the convoy travel state (State D).

When a convoy travel start notice has not been received, the process in SB11, just like SA6 of FIG. 3, determines whether the RSSI, the PER, and the relative position coordinates of the latest convoy travel information received from the sender vehicle satisfy the respective standards. Such determination is performed for the purpose of determining whether the convoy ready state (State B) should/can be further maintained. When all of the RSSI, the PER, and the relative position coordinates satisfy the standards (SB11, YES), the process returns to SB9. On the other hand, when at least one parameter does not satisfy the standard (SB11, NO), the process proceeds to SB12.

In SB12, the process changes the state parameter to the initial state (State A). In such case, the process mentioned above with reference to FIG. 3 will be performed.

Figure 6:
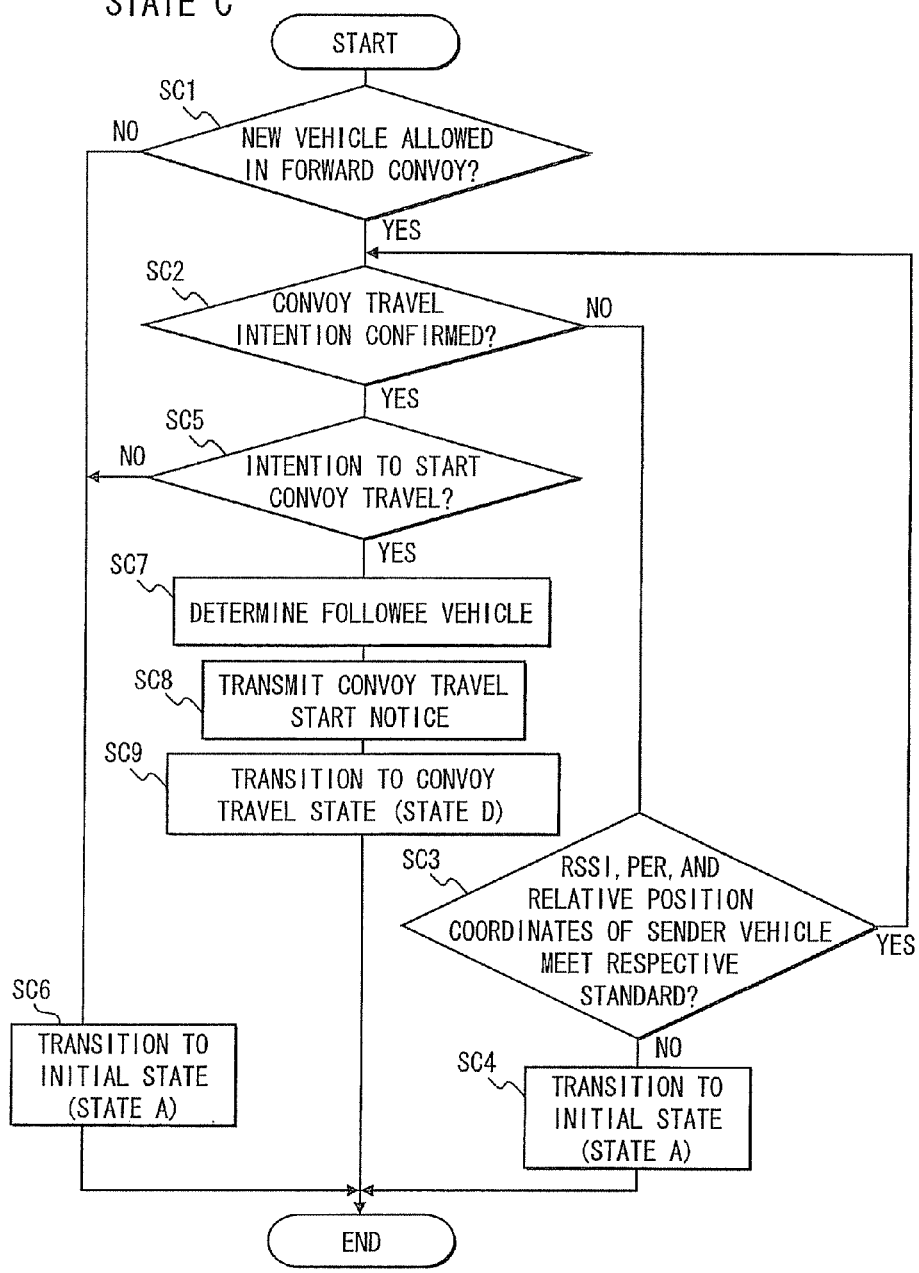
FIG. 6 is a flowchart of a process performed in a convoy enabling state (State C) by the convoy travel apparatus.

With reference to FIG. 6, the process executed in the convoy enabling state (State C) is described. According to the convoy ready state (State B), when the subject vehicle is the following vehicle, the subject vehicle can transition to the convoy enabling state (State C). While the subject vehicle is in the convoy enabling state (State C), the driver receives acknowledgement that the vehicle is enabled to travel in a convoy, either continuously or periodically. More practically, such acknowledgement of enablement of the convoy travel provided for the driver may, for example, appear on a display device positioned in a sight of the driver.

In SC1, the process determines whether a convoy traveling in front of the subject vehicle has room for accommodating a new vehicle. In other words, whether or not the maximum allowable number of the convoy has been reached is determined. Such determination may be made a number of ways. For instance, the subject vehicle may transition to the convoy enabling state (State C), when the forward vehicle is not in a convoy (SB2 of FIG. 5 is NO), in which case the forward vehicle is traveling solo, leading to the determination that the maximum allowable number has not been reached.

Figure 7:
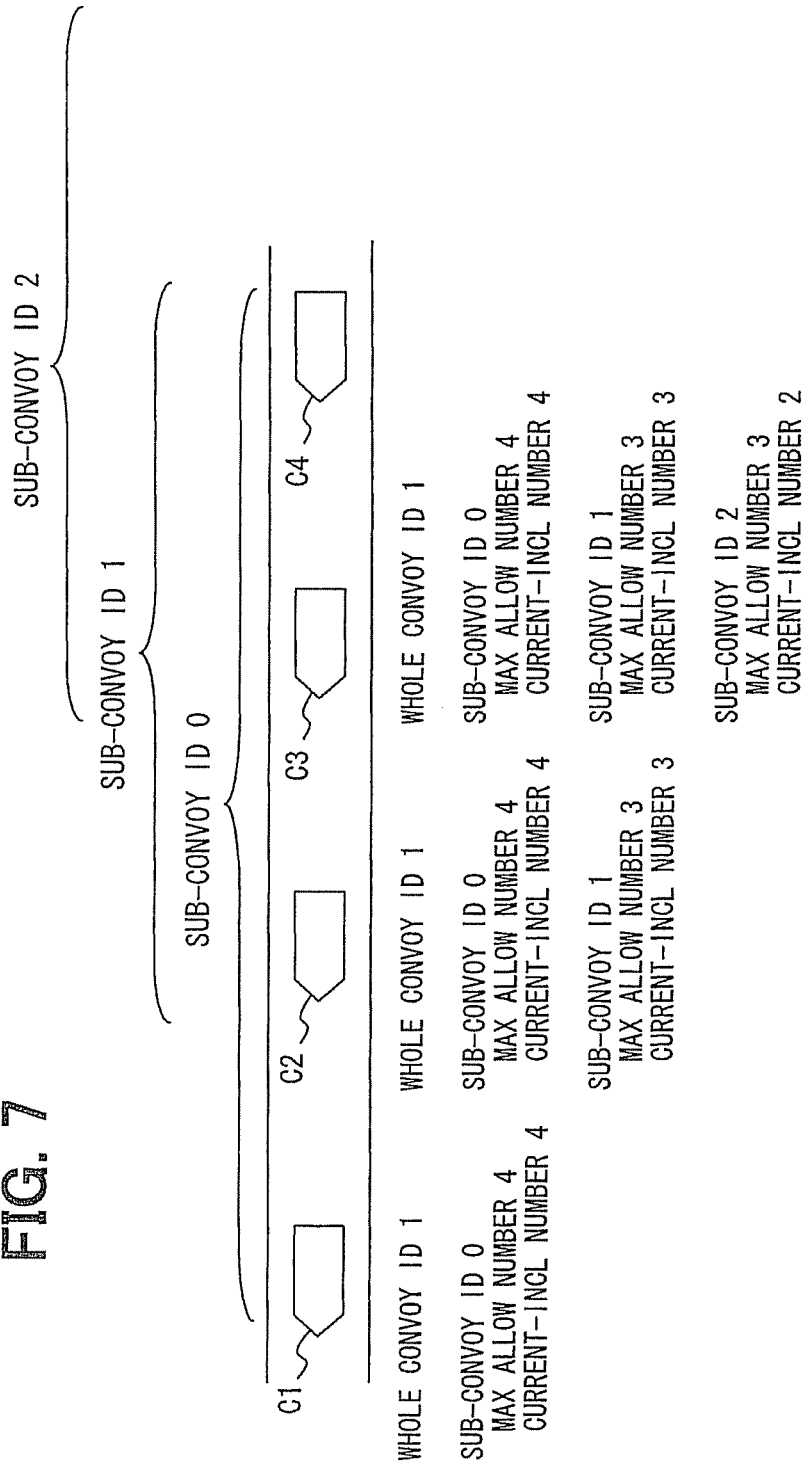
FIG. 7 is an illustration of a part of convoy travel information transmitted from each of the vehicles in the convoy in a convoy travel state (State D)

Also, the subject vehicle may transition to the convoy enabling state (state C), when the RSSI, PER, and the relative position coordinates of the leader is okay (SB6 of FIG. 5 is YES), in which case the information from the leader vehicle of the sub-convoy was received in high reception quality. The leader vehicle of such sub-convoy transmits convoy travel information that includes the maximum allowable number and the currently-included number of vehicles in the vehicle, as shown in FIG. 7. Thus, based on the maximum allowable number and the currently-included number of vehicles in the received convoy travel information from the leader vehicle of the sub-convoy, it is determined whether the sub-convoy has room for a new vehicle. Further, if the convoy travel information is received from two or more leader vehicles of sub-convoys, the determination in SC1 is affirmative upon determining that at least one of multiple leader vehicles is transmitting the convoy travel information indicating a new vehicle is allowed.

When it is determined in SC1 that there is no room for a new vehicle, no vehicle can join the convoy traveling in front of the subject vehicle (SC1, NO). Therefore, the process proceeds to SC6, and finishes the convoy enabling state (State C), and the vehicle transitions to the initial state (State A). On the other hand, the process proceeds to SC2 when it is determined that there is room for a new vehicle in the convoy (SC1, YES).

In SC2, the process determines whether the driver's intention regarding the convoy travel has been confirmed. More practically, it is determined whether the driver has performed a convoy travel start instruction operation (e.g., a convoy travel start button is pressed) or whether the driver has performed a convoy travel refusal instruction operation. When the driver has issued the convoy travel start instruction (SC2, YES), the process proceeds to SC5, and when the convoy travel refusal instruction operation is issued (SC2, NO), the process proceeds to SC3.

SC3 determines whether the RSSI, the PER, and the relative position coordinates in the convoy travel information received from the sender vehicle satisfy the respective standards, just like SB11 of FIG. 5. Such determination is to determine whether the convoy enabling state (State C) should be further maintained. When the RSSI, the PER, and the relative position coordinates all satisfy the standards (SC3, YES), the process returns to SC2. On the other hand, when at least one of the above does not satisfy the standard (SC3, NO), the process proceeds to SC4.

In SC4, the process changes the state parameter to the initial state (State A). In such case, the process in FIG. 3 is performed.

When the convoy travel intention of the driver has been confirmed in SC2, the process proceeds to SC5. In SC5, the process determines whether the driver's intention of the convoy travel confirmed in above-mentioned SC2 is an intention to start the convoy travel or a refusal. If such determination in SC5 is negative, that is, if the driver's intention was the refusal of the convoy travel, the process proceeds to SC6. In SC6, the process changes the state parameter to the initial state (State A). In such case, the process in FIG. 3 is performed.

On the other hand, the process proceeds to SC7 when the intention is to start convoy travel (SC5, Yes). In SC7, the process determines a right ahead vehicle (i.e., immediate ahead vehicle) as a followee vehicle, followed by the subject vehicle. Further, which vehicle is the right ahead vehicle is determined based on the identification result in SA3. Alternatively, the sender vehicle may also be identified in SC7 in the same manner as SA3. In SC8, the process transmits the convoy travel information that includes the convoy travel start notice. The followee vehicle (i.e., the vehicle followed by the subject vehicle) can identify that the vehicle transmitting the convoy travel start notice is a right behind vehicle based on the predetermined number of GPS positioning coordinates included in the convoy travel information.

The process proceeds to SC9 after having transmitted the convoy travel start notice in SC8, and the process changes the state parameter to the convoy travel state (State D).

The process executed in the convoy travel state (State D) is described in the following. FIG. 7 illustrates the convoy travel information transmitted by each vehicle in the convoy travel state (State D). More practically, the contents of the convoy travel information transmitted by each vehicle in the convoy travel state (State D) as well as how to organize a sub-convoy.

FIG. 7 shows a state that a convoy is traveling toward the left side of FIG. 7, and a vehicle C1 is the leader vehicle of the whole convoy.

The leader vehicle C1 of the whole convoy generates a whole convoy ID and transmits the generated whole convoy ID by controlling the convoy travel information to include such whole convoy ID. Further, for illustration purposes, the whole convoy ID is designated as "1" in the present embodiment. However, the actual ID may be a more complicated number.

Further, the leader vehicle C1 of the whole convoy is the leader vehicle of the first sub-convoy, and it generates a sub-convoy ID 0. The convoy travel information is transmitted with such sub-convoy ID as well as the maximum allowable number and the sub-convoy ID included therein.

The maximum allowable number is the number of vehicles allowable or to be included in the sub-convoy in which the subject vehicle is serving as the leader vehicle. The maximum allowable number counts the subject vehicle itself in the number. The maximum allowable number is a predetermined number determined according to the capacity of the wireless communication unit 11 of the subject vehicle. For example, when the capacity of the wireless communication unit 11 of the subject vehicle allows communication with three vehicles behind the subject vehicle, the maximum allowable number is set to 4, since the number includes the subject vehicle itself. The currently-included number of vehicles is incremented by 1 when the subject vehicle receives the convoy travel start notice from a vehicle that has newly joined the convoy to follow the subject vehicle.

The second vehicle C2 of the whole convoy becomes the following vehicle in the sub-convoy having the sub-convoy ID 0. Therefore, the convoy travel information transmitted from the vehicle C2 includes the whole convoy ID, the sub-convoy ID 0, the maximum allowable number and the currently-included number of vehicles of the sub-convoy. Further, in the present embodiment, the leader vehicles of the sub-convoys are successively arranged, next to each other. In other words, the second vehicle C2 of the whole convoy is also the leader vehicle of the second sub-convoy, which is next to the first sub-convoy in which the vehicle C1 serves as the leader vehicle. Therefore, the convoy travel information from the vehicle C2 further includes the sub-convoy ID 1 in which the vehicle C2 serves as the leader vehicle. Further, the convoy travel information from the vehicle C2 further includes the maximum allowable number and the currently-included number of vehicles of such sub-convoy ID 1, since the vehicle C2 is the leader vehicle of the sub-convoy ID 1. In the example of FIG. 7, since the maximum allowable number is 3, the sub-convoy having the sub-convoy ID 1 allows at most 3 vehicles in the sub-convoy.

The third vehicle C3 of the whole convoy becomes the following vehicle in both of two sub-convoys having the sub-convoy IDs of 0 and 1. Therefore, the convoy travel information from the third vehicle C3 includes the whole convoy ID, the sub-convoy IDs of 0, 1, and the maximum allowable numbers and the currently-included numbers of those two sub-convoys. Further, the convoy travel information from the vehicle C3 further includes the sub-convoy ID 2 because the vehicle C3 is the leader vehicle of the third sub-convoy. In addition, the convoy travel information from the vehicle C3 further includes the maximum allowable number and the currently-included number of vehicles of the third sub-convoy, since the vehicle C3 is the leader vehicle of the third sub-convoy. In the example of FIG. 7, the maximum allowable number is 3. Further, since the sub-convoy having the sub-convoy ID 2 includes the vehicle C3 and one following vehicle C4 only, the currently-included number of the sub-convoy having the sub-convoy ID 2 is 2.

The process executed in the convoy travel state (State D) is described with reference to FIG. 8 in the following. When the subject vehicle is a following vehicle, the subject vehicle may transition to the convoy travel state (State D) from SC9 of FIG. 6. When the subject vehicle is a forward vehicle, the subject vehicle may transition to the convoy travel state (State D) from SB10 of FIG. 5.

At first, in SD1, the subject vehicle determines whether the subject vehicle itself is the leader vehicle of the whole convoy. When it is determined that the subject vehicle is the leader vehicle of the whole convoy, the process proceeds to SD2, and, when it is determined that the subject vehicle is a following vehicle of the whole convoy (i.e., a vehicle except the leader vehicle), the process proceeds to SD3.

In SD2, the process generates and transmits convoy travel information. The convoy travel information includes the whole convoy ID, the sub-convoy ID, the currently-included number, the maximum allowable number, as well as the convoy travel information from the initial state (State A), that is, the travel information of the subject vehicle.

Among the above-described information included in the convoy travel information, the whole convoy ID is generated at a first execution time of SD2 after the formation of the convoy, and the generated whole convoy ID is re-used thereafter. The whole convoy ID is generated according to a generation rule that controls the ID to have a different number at each time of generation and to have at least a predetermined number of digits, for the improvement of security and for preventing, as much as possible, the mix up with the ID assigned to the other convoy. For example, the ID may be generated based on coordinates at a time of starting the convoy travel, a time of starting the convoy travel, a randomly generated text string, and/or a combination of those numbers and strings.

Unlike the whole convoy ID, the sub-convoy ID is generated as a simple number for the ease of understanding that at what number of order the sub-convoy currently is in the whole convoy. In the present embodiment, the first sub-convoy ID is 0, and the ID is sequentially incremented by 1. Therefore, the sub-convoy ID generated in SD2 is 0. This concludes the explanation of SD2. The process then proceeds to SD7 to be described later after processing in SD2.

In SD3, it is determined whether the subject vehicle is the leader vehicle of the sub-convoy. More practically, the process in SD3 determines whether the subject vehicle is the leader vehicle of the second or further subsequent sub-convoy of the whole convoy, because SD3 is performed when the subject vehicle is not the leader vehicle of the whole convoy. Further, when SD57 is performed, which is described later, the subject vehicle recognizes that it is the leader vehicle of a convoy. When the determination in the subject vehicle is a leader of sub-convoy (SD3, Yes), the process proceeds to SD5, and, when the subject vehicle is not a leader of sub-convoy (SD3, No), the process proceeds to SD4.

When SD4 is performed, it is already determined that the subject vehicle is a following vehicle in a sub-convoy and the subject vehicle is not a leader vehicle of any sub-convoy. In SD4, a process for the following vehicle of the sub-convoy (i.e., a follower process) is performed.

Figure 9:
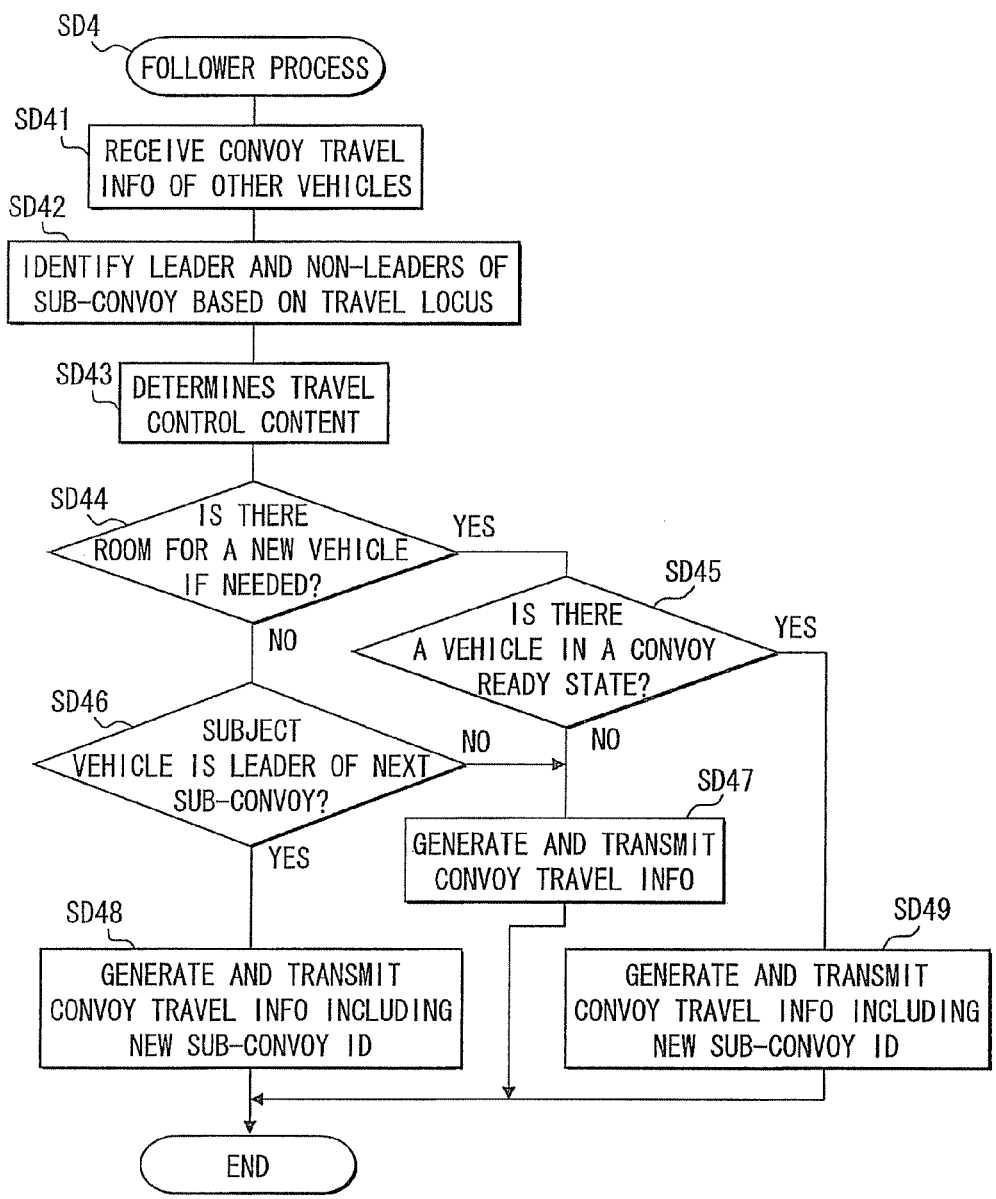
FIG. 9 is a flowchart of a follower process in SD5 of FIG. 8.

FIG. 9 is a flowchart of the details of the follower process of SD4. In SD41 of the follower process, the subject vehicle receives convoy travel information from multiple vehicles (i.e., other vehicles) in the convoy. The subject vehicle may also receive the convoy travel information from a vehicle outside of the convoy if such vehicle is traveling around the subject vehicle. However, in the present embodiment, the sub-convoy is a unit of performing the convoy travel control. Therefore, the subject vehicle performs the convoy travel control for itself based on the convoy travel information of the leader vehicle of the sub-convoy to which the subject vehicle belongs as a following vehicle.

Therefore, in SD42, the process identifies the convoy travel information of the leader vehicle of the sub-convoy, which is considered as a unit of convoy travel control by the subject vehicle, from among many sets of convoy travel information respectively received from multiple vehicles. Further, as illustrated above with reference to FIG. 7, each of the sub-convoys in the present embodiment is arranged to have its leader vehicle traveling next to each other in succession. Therefore, the subject vehicle performs the convoy travel control for itself based on the convoy travel information from the leader vehicle of a sub-convoy, which is identified as the one to which the subject vehicle belongs, by checking the sub-convoy IDs even when the convoy travel information is possibly received from many leader vehicles of sub-convoys. That is, the leader of the sub-convoy for the subject vehicle is the leader of the sub-convoy ID having the smallest value among all the other sub-convoy IDs that respectively has the currently-included number of vehicles (including the subject vehicle) not exceeding the maximum allowable number.

In the example of FIG. 7, the vehicle C3 receives the convoy travel information from two leader vehicles of the sub-convoys respectively having the sub-convoy ID 0 and the sub-convoy ID 1. In such case, the convoy travel information of the leader vehicle having the sub-convoy ID 0, i.e., the vehicle C1, is considered as the one to be used by the subject vehicle (i.e., the vehicle C3) for performing the convoy travel control. However, the behavior of the vehicle C2 should also be considered for performing the convoy travel control, because the vehicle C2 is a forward vehicle of the vehicle C3 in the sub-convoy having the sub-convoy ID 0. Therefore, the vehicle C3 also identifies the convoy travel information of the vehicle C2.

The identification of the convoy travel information of the vehicle C2 is performed in the following manner. A travel locus is generated for each of the convoy travel information received, which respectively include the predetermined number of measurements of the GPS positioning coordinates. Based on a comparison between each of travel loci generated and a past travel loci generated from the memory-stored convoy travel information, a positional relationship with each sender vehicles, which respectively sent the convoy travel information in and out of the convoy is identified.

Based on such identification, the convoy travel information received is associated either with an immediate front vehicle, a vehicle one further in the forward direction, or the like. Therefore, based on such identification result and at what number of order the subject vehicle is in the sub-convoy, the convoy travel information of the leader vehicle of the sub-convoy is identified, which is required for the subject vehicle to perform the convoy travel control for itself. In such case, the predetermined number of measurements of GPS positioning coordinates transmitted from the leader vehicle are used for the identification of the leader vehicle. Therefore, the predetermined number of measurements of GPS positioning coordinates may be provided as "leader information" in claims.

Further, the number of order in the sub-convoy can be calculated by adding 1 to the currently-included number that is included in the convoy travel information from the leader vehicle of the sub-convoy, which is received at a time of joining the sub-convoy. As provided earlier, the convoy travel information of the leader vehicle of the sub-convoy includes the currently-included number and the maximum allowable number, whereas the convoy travel information of the follower vehicle of the sub-convoy does not. Therefore, the currently-included number and the maximum allowable number may be used as the "leader information." Further, in SD42, the process also identifies the convoy travel information of an intermediate vehicle where the intermediate vehicle exists between the leader vehicle and the subject vehicle in the sub-convoy to which the subject vehicle belong as the following vehicle.

Based on the convoy travel information of the other vehicle in the sub-convoy identified in SD42, in SD43, the contents of the convoy travel control of the subject vehicle, that is, the travel control for the subject vehicle in order to maintain the sub-convoy (e.g., speed control, steering control and the like), are determined. The process of SD43 is similar to the process performed in a publicly-known convoy travel control.

In SD44, the process determines whether there is room for a new vehicle in the allowable number of the sub-convoy in which the subject vehicle performs the convoy travel control as a following vehicle. Such determination is performed by comparing (i) the maximum allowable number included in the convoy travel information received from the leader vehicle of the sub-convoy with (ii) the currently-included number of vehicles. If the maximum allowable number is equal to the currently-included number, the process determines there is no room for a new vehicle (SD44, No), and proceeds to SD46. On the other hand, if the maximum allowable number is greater than the currently-included number, the process determines there is room for a new vehicle (SD44, Yes), and t proceeds to SD45.

In SD45, the process determines whether any vehicle is detected to be continuously staying in the convoy ready state (State B). Specifically, when a vehicle determines in SB3 of FIG. 5 that the information received is not from a leader vehicle (SB3, No) the vehicle stays in the convoy ready state (State B). In other words, after transitioning to the convoy ready state (State B) by receiving the convoy travel information from the right ahead vehicle, if a vehicle cannot receive the convoy travel information from the leader vehicle of the sub-convoy in high reception quality, the vehicle stays in the convoy ready state (State B).

Figure 11:
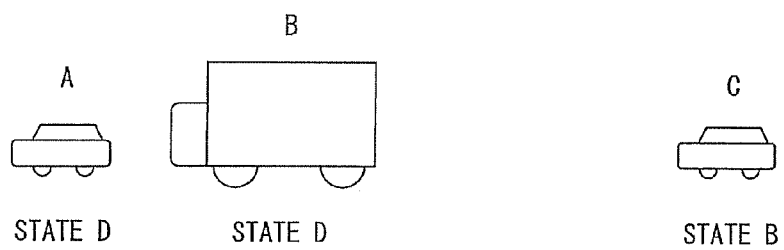
FIG. 11 is an illustration of a situation in which a sub-convoy leader vehicle and a State-B vehicle have a wave-blocker vehicle interposed therebetween.

With reference to FIG. 11, such situation arises when at least one following vehicle traveling between the leader vehicle of the sub-convoy and a vehicle staying in the convoy ready state (State B) interrupts the signal from the leader vehicle. For instance, when a large vehicle B is traveling right behind a vehicle A that is the leader vehicle of the sub-convoy, a vehicle C may not receive the signal (i.e., the convoy travel information) transmitted by the vehicle A, and the vehicle C, therefore, stays in the convoy ready state (State B).

A vehicle in the convoy determines whether a vehicle not in the convoy (i.e., out-of-convoy vehicle) is in the convoy ready state (State B). For instance, when the convoy travel information from the out-of-convoy vehicle can be received continuously for at least a predetermined time in high reception quality, the out-of-convoy vehicle is determined as being in the convoy ready state (State B). In the example of FIG. 11, the vehicle B, which is following the vehicle A, can continuously receive the convoy travel information in high reception quality from the vehicle C, which is the out-of-convoy vehicle. Therefore, the vehicle B detects an out-of-convoy vehicle in the convoy ready state (State B) (SD45, Yes), where the vehicle B may be a "wave-blocker" vehicle. When an out-of-convoy vehicle is detected, the process proceeds to SD49, and when an out-of-convoy vehicle is not detected (SD45, No), the process proceeds to SD47.

In SD44, when the process determines there is no room for a new vehicle (SD44, No), the process proceeds to SD46 to determine whether the subject vehicle becomes a leader vehicle of the next sub-convoy. In the present embodiment, the sub-convoys are formed so that the leader vehicles of the sub-convoys are arranged in a successive manner. Therefore, the determination in SD46 will determine whether the subject vehicle is traveling right behind the leader vehicle in the sub-convoy in which the subject vehicle is traveling as a following vehicle. When the subject vehicle is not traveling right behind the leader vehicle of the sub-convoy, the process proceeds to SD47, and when it is traveling right behind the leader vehicle, the process proceeds to SD48.

In SD47, the process generates and transmits the convoy travel information of the subject vehicle. The convoy travel information generated in SD47 includes the whole convoy ID, the sub-convoy ID of the sub-convoy in which the subject vehicle is traveling as the following vehicle, and the travel information of the subject vehicle.

On the other hand, when SD48 is performed, the subject vehicle becomes the leader vehicle of a new sub-convoy. Therefore, in SD48, it generates a new sub-convoy ID. The convoy travel information generated in SD48 includes the convoy travel information generated in SD47 with added thereto (i) the generated sub-convoy ID, (ii) the maximum allowable number of the sub-convoy in which the subject vehicle serves as the leader vehicle, and (iii) the currently-included number of vehicle in such sub-convoy.

The currently-included number may be determined by counting the number of the convoy travel start notices, which are received while the subject vehicle is traveling as a following vehicle, or may be determined as the number of the follower vehicles in the process of SD42 for identifying the sender vehicle of the convoy travel.

When it is determined there is no room in the sub-convoy in SD44, a vehicle to be serving as the leader vehicle of the next sub-convoy performs SD48, thereby forming a new sub-convoy. In such manner, the rearmost sub-convoy in the whole convoy always has room for a new vehicle.

Further, the process of SD49 to be performed after the affirmative determination of SD45 is completely the same process as SD48. Therefore, whenever the subject vehicle detects a vehicle staying in the convoy ready state (State B), the subject vehicle becomes a leader vehicle of the next sub-convoy, even when the maximum allowable number of the sub-convoy has a room for a new vehicle. Therefore, the vehicle B in FIG. 11 becomes the leader vehicle of the sub-convoy. In such manner, the vehicle C receives the convoy travel information of the leader vehicle from the vehicle B, and SB6 is determined as affirmative by the vehicle C. Therefore, the vehicle C is allowed to join the convoy.

Figure 8:
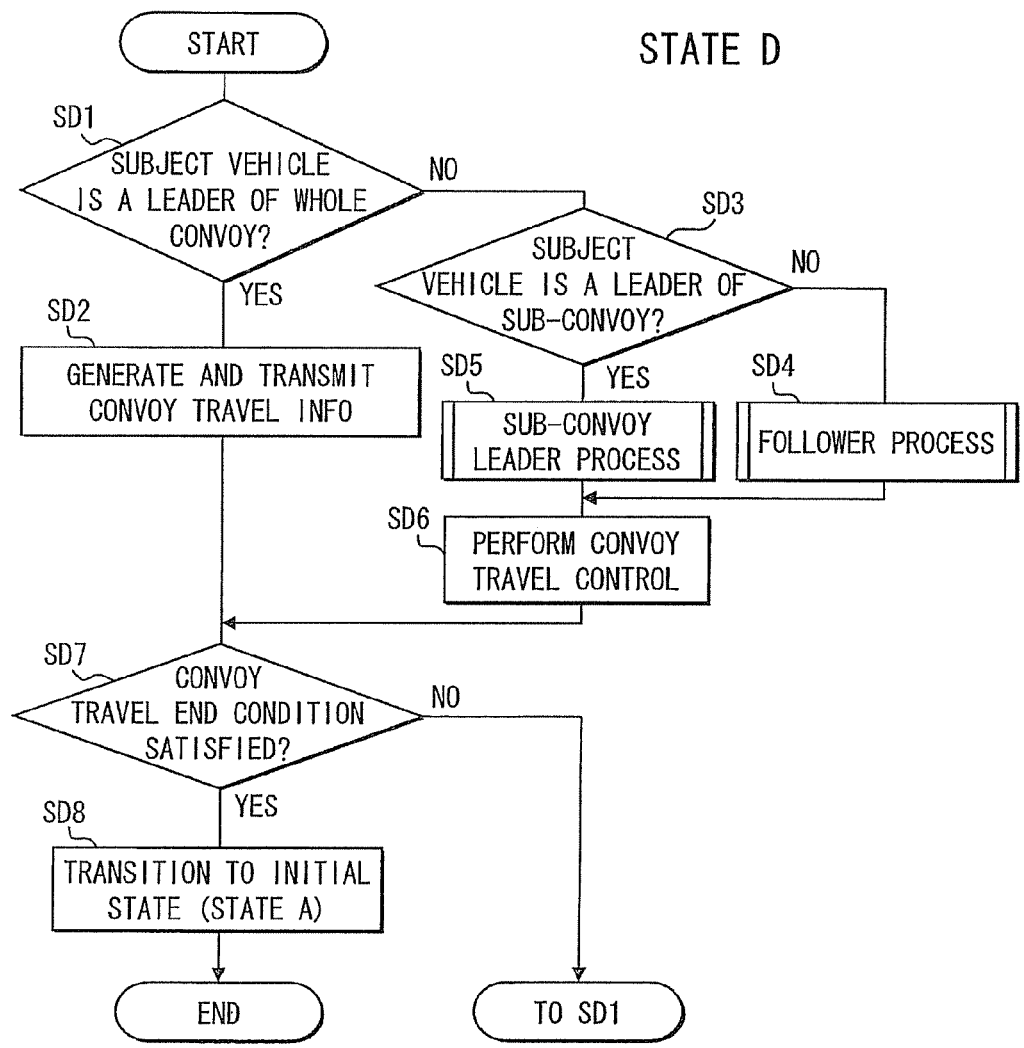
FIG. 8 is a flowchart of a process performed in the convoy travel state (State D) by the convoy travel apparatus.

When either SD47, SD48, or SD49 is performed, the process proceeds to SD6 of FIG. 8. In SD6, the process performs convoy travel control of the subject vehicle, based on the determination in SD42 of FIG. 9. The process then proceeds to SD7.

Figure 10:
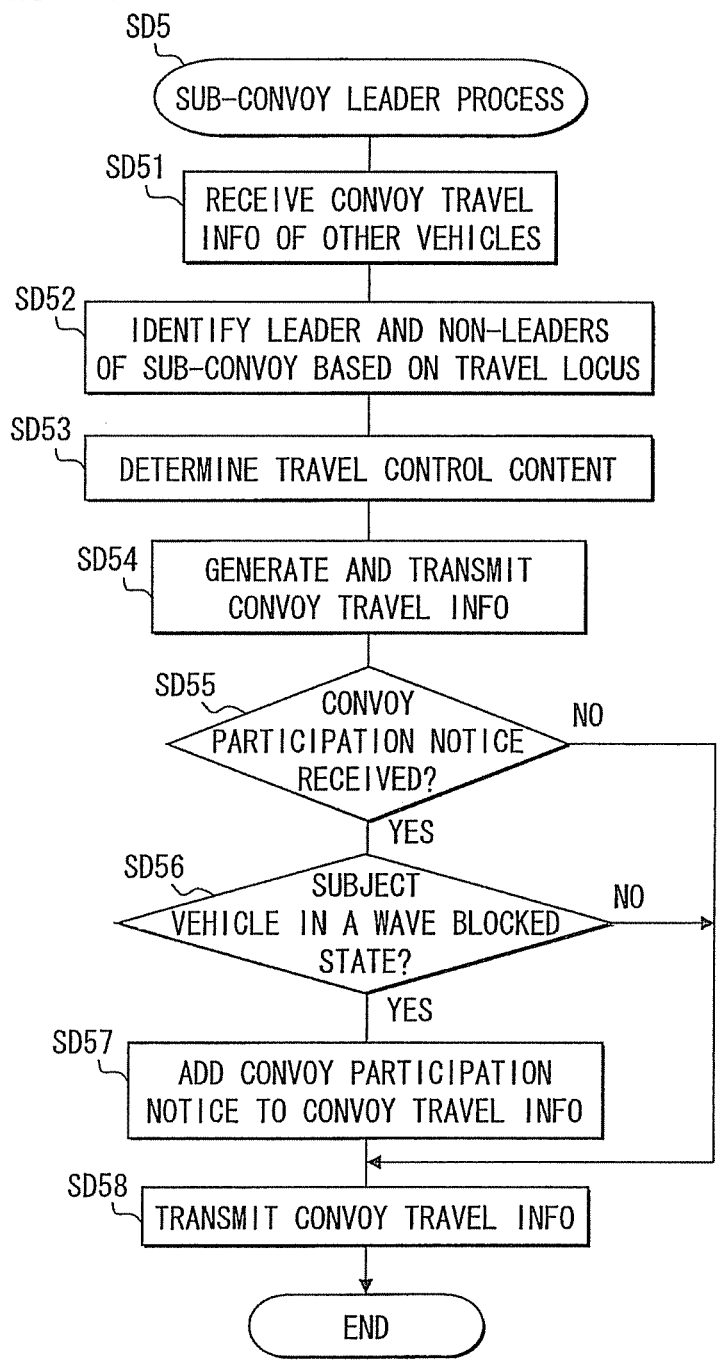
FIG. 10 is a flowchart of a sub-convoy leader process in SD4 of FIG. 8.

In SD3, when the subject vehicle is a leader of a sub-convoy (SD3, Yes) the process in SD5 performs the sub-convoy leader process of FIG. 10, which is performed by the leader vehicle of the second or subsequent sub-convoys in the whole convoy.

With reference to FIG. 10, the process, in SD1 receives the convoy travel information transmitted from the other vehicle, just like SD41 of FIG. 9. In SD52, the same process as SD42 of FIG. 9 is performed, and such process identifies the convoy travel information of the leader vehicle of the sub-convoy that is considered as a unit of convoy travel control by the subject vehicle, from among many sets of convoy travel information respectively received from multiple vehicles. Further, the process also identifies the convoy travel information of a vehicle that is detected as one between the leader vehicle and the subject vehicle in the sub-convoy where the subject vehicle is traveling as a following vehicle.

In SD53, based on the convoy travel information of the other vehicle in the sub-convoy identified in SD52, contents of the convoy travel control of the subject vehicle are determined. The process of SD53 is the same as SD43 of FIG. 9, which is performed when the subject vehicle is a following vehicle of a sub-convoy. In other words, a leader vehicle of a sub-convoy may also determine the contents of the convoy travel control as a following vehicle of a preceding sub-convoy.

In SD54, the process generates the convoy travel information. The generated convoy travel information includes the whole convoy ID, the sub-convoy ID of all sub-convoys to which the subject vehicle belongs, the currently-included number and the maximum allowable number of vehicles in the sub-convoy in which the subject vehicle serves as a leader vehicle, and the contents of the convoy travel control determined in SD53, together with the convoy travel information of the initial state (State A).

The whole convoy ID and the sub-convoy ID of the sub-convoy in which the subject vehicle is traveling as a following vehicle are acquired from the convoy travel information transmitted from the leader vehicle of the sub-convoy. Further, the sub-convoy ID of the sub-convoy in which the subject vehicle serves as a leader vehicle is the one determined in SD48 or SD49 at a time of determination that the subject vehicle will become a leader vehicle of a new sub-convoy. Further, the currently-included number may be determined by counting the number of the convoy travel start notices which are received after the subject vehicle has joined the convoy, or may be determined as the number of the follower vehicles in the process of SD42 for identifying the sender vehicle of the convoy travel identification.

In SD55, it is determined whether the subject vehicle has received a convoy participation notice. If such determination is negative, the process proceeds to SD58, and, if such determination is affirmative, the process proceeds to SD56.

In SD56, the process determines whether the subject vehicle is in a wave blocked state. The wave blocked state occurs when the following two conditions are satisfied. The first condition is the sub-convoy in which the subject vehicle is traveling as a following vehicle has room for a new vehicle. The second condition is, due to the wave blocked state that is caused by the subject vehicle (i.e., a wave blocker), the signal from the leader vehicle of the sub-convoy cannot reach a position of the rearmost vehicle of the maximum allowable number, which is included in the convoy travel information from the leader vehicle. The first condition is examined in the same manner as SD44, and the second condition is examined in the same manner as SD45. Therefore, the determination of SD56 is affirmative when the subject vehicle has determined SD45 as affirmative and has performed SD49. When the determination in SD56 is affirmative, the process proceeds to SD57, and, when the determination in SD56 is negative, the process proceeds to SD58.

When the subject vehicle is ready to perform SD57, it is in a state of recognizing that a new vehicle has joined the sub-convoy in which the subject vehicle is serving as a leader vehicle. Further, since a sub-convoy in which the subject vehicle is traveling as a following vehicle has room for a new vehicle, this newly joined vehicle is positioned within a convoy scope that can be included in the above sub-convoy in which the subject vehicle is traveling as a following vehicle. Therefore, for notifying the leader vehicle of the sub-convoy in which the subject vehicle is traveling as a following vehicle about the increase of the number of vehicles traveling in the convoy scope, the process in SD57 adds the convoy participation notice to the convoy travel information generated in SD54.

In SD58, the process transmits the generated convoy travel information from the wireless communication unit 11. The convoy travel information transmitted in SD58 includes the contents of the convoy travel control that are determined as a following vehicle of a sub-convoy. Further, the convoy travel information transmitted in SD58 is received at a time of execution of SD41 by the following vehicle(s) in the sub-convoy in which the subject vehicle is serving as a leader vehicle. Further, the following vehicle receiving the convoy travel information determines the contents of the convoy travel control based on the convoy travel information received. Therefore, the contents of the convoy travel control that is determined in SD41 by the following vehicle of the sub-convoy indirectly reflect the convoy travel information of the leader vehicle of the preceding sub-convoy.

The process proceeds to SD6 of FIG. 8 after performing SD58. In SD6, the process performs convoy travel control based on SD53 of FIG. 10. The process then proceeds to SD7.

In SD7, it is determined whether a convoy travel end condition is satisfied. The convoy travel end condition may be, for example, an override operation performed by the driver, a move of the subject vehicle to another lane, an input operation indicating an intention of ending the convoy travel, or the like. The override operation is an operation by the driver operating the vehicle that generates a behavior that is in conflict with a behavior determined by an adaptively-following travel control of the vehicle. For example, when a behavior determined by the adaptively-following travel control of a vehicle is an acceleration of the vehicle, a braking operation by the driver would be an override operation.

If the determination in SD7 is negative, the process returns to SD1. On the other hand, the process proceeds to SD8 if the determination in SD7 is affirmative. In SD8, the process changes the state parameter to the initial state (State A). In such case, the process in FIG. 3 is performed.

Based on present disclosure, when the subject vehicle is a following vehicle and while the maximum allowable number and the currently-included number in the convoy travel information transmitted from the leader vehicle indicates that there is room for a new vehicle to join the convoy (SD44, YES), the convoy travel control apparatus determines whether the convoy is in the wave blocked state that prevents the transmission of the convoy travel information transmitted from the leader vehicle to a vehicle position of the maximum allowable number in the convoy, due to the subject vehicle serving as a wave blocker (SD45).

If it is determined that the convoy is in the wave blocked state (SD45, YES), the convoy travel information that indicates that the subject vehicle is a leader vehicle (SD49) is generated and transmitted. In such manner, the newly joining vehicle (i.e., the vehicle C in FIG. 11) joining the convoy can receive the convoy travel information transmitted from a following vehicle (i.e., the vehicle B in FIG. 11) that is serving as a leader vehicle. Further, since the received convoy travel information includes the leader information and the information regarding the current allowable number of vehicles, the out-of-convoy vehicle (i.e., the vehicle C in FIG. 11) can newly join the convoy and can perform the convoy travel control even when there is a following vehicle (i.e., the vehicle B in FIG. 11) blocking the signal of the leader vehicle (i.e., the vehicle A in FIG. 11).

Further, in the present embodiment, after determining that the convoy is in the wave blocked state and the subject vehicle becomes a leader vehicle of the sub-convoy (i.e., when SD49 is performed), the process transmits the convoy travel information that includes the received convoy participation notice (SD57, SD58). In such manner, the convoy travel information blocked leader vehicle (i.e., the vehicle A in FIG. 11) can recognize the number of vehicles traveling in the scope of the convoy lead by itself has increased by 1.

Modification Example 1

When the subject vehicle is an out-of-convoy vehicle, which is joining to a tail end of the convoy, such subject vehicle may receive the convoy travel information including the maximum allowable number and the currently-included number of vehicles from each of the leader vehicles of multiple sub-convoys.

Figure 12:
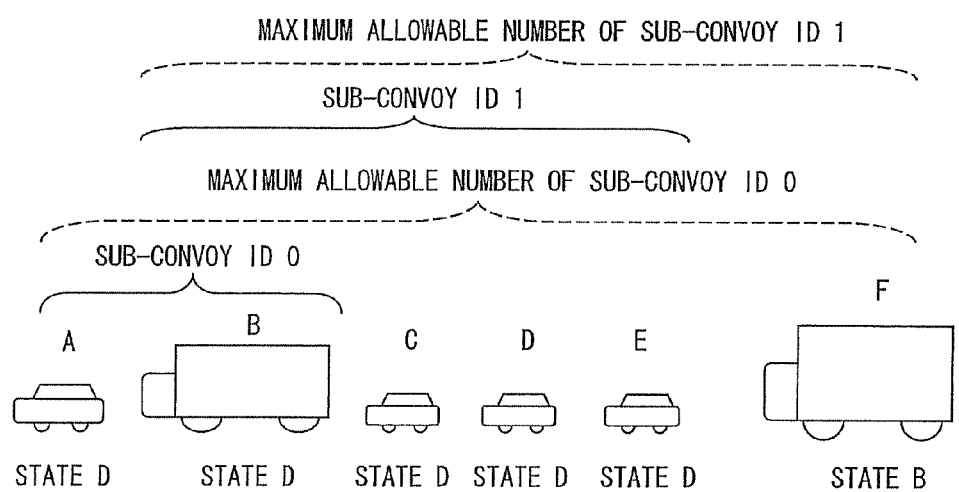
FIG. 12 is an illustration of a situation in which a vehicle is receiving convoy travel information from each of two leader vehicles.

For example, in an example of FIG. 12, due to the vehicle B serving as a wave blocker, the signal from the vehicle A cannot reach the vehicles C, D, E, and, the vehicles C, D, E respectively perform the convoy travel control in a sub-convoy which is lead by the vehicle B. Further, a sub-convoy having the vehicle A as a leader vehicle includes two vehicles A and B.

However, the maximum allowable number of the vehicle A is 6 as shown in FIG. 12, which is indicated by a dashed line, and the vehicle F newly joining the whole convoy may possibly receive the electric wave from the vehicle A if the vehicle F is a "tall" vehicle. Further, the vehicle F can also receive the electric wave from the vehicle B if the maximum allowable number of the vehicle B is 5 or more. In such case, the vehicle F performs the convoy travel controls, considering a further forward vehicle, which is the vehicle A, as the leader vehicle. In such case, which one of many vehicles is traveling further ahead may be determined, for example, by using a sender identification method based on the sub-convoy ID, or based on the travel locus described above.

As described above, by using the convoy travel information of a further forward leader vehicle, the whole convoy uses/shares the information transmitted from the vehicle traveling further ahead. Therefore, the behavior of the vehicle traveling in a front portion of the convoy can swiftly be reflected to the vehicle control.

However, if the information received from the forward vehicle is not in high reception quality, the convoy travel control may not be securely/stably performed. Therefore, when the convoy travel information can be received from each of the leader vehicles of multiple sub-convoys, the convoy travel information having a reception quality that is equal to or above a certain standard may only be used. Further, from among the convoy travel information having an over-the-standard quality, the farthest front leader vehicle's convoy travel information may be used as the information of the leader vehicle in the subject vehicle's convoy travel control. In such manner, disablement of the convoy travel control due to the blocked reception of the convoy travel information from the vehicle which is set as the leader vehicle is prevented.

Based on the present embodiment, when the subject vehicle is (i) a vehicle outside of a convoy, joining to a rear end of the convoy and (ii) receiving the convoy travel information including the current allowable number of vehicles from multiple leader vehicles, the subject vehicle uses the convoy travel information received from a farthest forward leader vehicle for the convoy travel control of the subject vehicle, considering that the farthest forward vehicle is a leader of a convoy.

By using the information from the farthest forward leader vehicle, the information comes from a vehicle in the farthest front part of the convoy. Therefore, the vehicle behavior of the convoy front part can be quickly reflected to the vehicle control of other vehicles.

In addition, the convoy travel information received from the farthest forward leader vehicle for the convoy travel control of the subject vehicle from among many sets of the convoy travel information having a reception quality being equal to or above a predetermined standard received by the wireless communication unit is used by the subject vehicle. In such manner, interruption of the convoy travel control of the subject vehicle can be prevented even when the convoy travel information cannot be received from a leader vehicle that is set by the subject vehicle itself.

In addition to the above, when the subject vehicle is a vehicle outside of a convoy and has joined a rear end of the convoy, the convoy travel apparatus 10 of the subject vehicle transmits a convoy participation notice from the wireless communication unit. Further, when the subject vehicle receives a convoy participation notice after becoming a leader vehicle based on a determination of the wave-blocked state, the subject vehicle notifies the leader vehicle of a convoy in which the subject vehicle is traveling as a follower vehicle that a new vehicle has joined the convoy in which the subject vehicle is traveling as the follower vehicle.

When the leader vehicle is in the wave blocked state, which interrupts the transmission of the convoy travel information, the leader vehicle cannot recognize that a new vehicle is joining the convoy. However, the leader vehicle suffering from the information interruption can recognize that the number of vehicles in the scope of the convoy which is lead by itself has increased by one.

When at least one of the follower vehicles serves as a wave blocker, which blocks the information transmission from the leader vehicle, a new vehicle may not be able to join the convoy. However, the wave blocker vehicle can receive the convoy travel information from the new vehicle outside of the convoy in high reception quality. Therefore, the convoy travel apparatus 10 can determine that the subject vehicle itself is the wave blocker. That is, the convoy travel apparatus can determine that the subject vehicle is the wave blocker, blocking an electric wave from the leader vehicle of the convoy, when a new vehicle does not join the convoy even when the subject vehicle has been receiving the convoy travel information in an above-standard reception quality for at least a predetermined period of time from the new vehicle outside of the convoy.

Further, the convoy travel information for the convoy travel transmitted with the information of height of the subject vehicle may be utilized for an easy determination of the wave blocking state of the subject vehicle itself.

That is, the convoy travel information includes information of height of the subject vehicle, and the convoy travel apparatus determines that the subject vehicle is a wave blocker, blocking an electric wave from the leader vehicle of the convoy when (i) the subject vehicle is a follower vehicle in the convoy, (ii) the subject vehicle is receiving the convoy travel information from a vehicle outside of the convoy in an above-standard reception quality, and (iii) a comparison between a vehicle height in the received convoy travel information and a vehicle height of the subject vehicle shows that the vehicle height of the subject vehicle is greater than the one in the convoy travel information received.

Although the present disclosure has been fully described in connection with the preferred embodiment thereof with reference to the accompanying drawings, it is to be noted that various changes and modifications will become apparent to those skilled in the art.

For example, the vehicle height of the subject vehicle included in the convoy travel information in some cases may be utilized for determining whether the subject vehicle is a wave blocker or not. More practically, when the convoy travel information, which is in this case configured to be transmitted from each vehicle with the vehicle height included therein, is received in high reception quality from a vehicle outside of the convoy, the determination of SD45 may be replaced with a determination by comparison of vehicle heights, between the vehicle height included in the received convoy travel information and the vehicle height of the subject vehicle. When the determination of vehicle height comparison indicates that the vehicle height of the subject vehicle is greater than the received height, it may be determined that the subject vehicle is a wave blocker.

Further, for example, though the leader vehicles of the sub-convoys are arranged in succession in the above-described embodiment, the rearmost vehicle of a sub-convoy may become a leader vehicle of the next sub-convoy. In such case, the determination of whether the subject vehicle is a leader vehicle of the next sub-convoy in SD46 may be performed as a determination that the subject vehicle is a rearmost vehicle of a sub-convoy. Whether the subject vehicle is a rearmost vehicle of a sub-convoy is determined by examining if the maximum allowable number of vehicles is equal to the currently-included number of vehicles.

Such changes and modifications are to be understood as being within the scope of the present disclosure as defined by the appended claims.

What is claimed is:

1. A convoy travel apparatus disposed in a subject vehicle and in other vehicles, the apparatus comprising:
   a control unit generating convoy travel information of the subject vehicle, and performing convoy travel control of the subject vehicle, the convoy travel information including travel information of the subject vehicle; and
   a wireless communication unit performing vehicle-to-vehicle communication, the wireless communication unit regularly transmitting the convoy travel information of the subject vehicle generated by the control unit and receiving convoy travel information from the other vehicles, wherein
   the control unit determines whether each of the subject vehicle and the other vehicles is a follower vehicle of a convoy or a leader vehicle of the convoy,
   the control unit generates the convoy travel information to further include (i) leader information that allows the follower vehicle to determine the leader vehicle of the convoy and (ii) capacity information providing a current allowable number of vehicles of the convoy, when the control unit determines the leader vehicle of the convoy,
   the control unit performs the convoy travel control of the follower vehicle per the convoy travel information received from the leader vehicle of the convoy which includes the follower vehicle,
   the control unit determines whether the follower vehicle of the convoy is a wave blocker blocking a signal transmitted by the leader vehicle such that the convoy travel information from the leader vehicle is not reachable to a position of a rearmost vehicle in the convoy, when the convoy travel information from the leader vehicle includes the current allowable number of vehicles indicating that a convoy capacity has space for a new vehicle in the convoy, and when the follower vehicle is determined to be the wave blocker, the control unit designates the follower vehicle as a representative leader of the convoy and generates the convoy travel information to further include the leader information and the capacity information of the current allowable number of vehicles of the convoy.

2. A convoy travel apparatus disposed in a subject vehicle and in other vehicles of a convoy, the apparatus comprising:
   a control unit performing convoy travel control and generating convoy travel information of the subject vehicle, the convoy travel information including travel information of the subject vehicle; and
   a wireless communication unit performing vehicle-to-vehicle communication, the wireless communication unit regularly transmitting the convoy travel information of the subject vehicle and receiving convoy travel information from the other vehicles, wherein
   the convoy travel information includes a whole convoy ID representing a whole convoy and at least one sub-convoy ID representing a sub-convoy, the sub-convoy is organized by dividing the whole convoy, each sub-convoy including a number of vehicles less than or equal to a predetermined value defined by a communication capacity of the wireless communication unit of a sub-convoy leader vehicle,
   the control unit determines whether each of the subject vehicle and the other vehicles is a follower vehicle in a or the sub-convoy leader vehicle of the sub-convoy,
   the control unit generates the convoy travel information to further include (i) leader information that allows the follower vehicle of the sub-convoy to determine the sub-convoy leader vehicle and (ii) capacity information providing a current allowable number of vehicles of the sub-convoy, when the control unit determines the sub-convoy leader vehicle of the sub-convoy,
   the control unit performs the convoy travel control of the follower vehicle based on, the convoy travel information received from the sub-convoy leader vehicle of the sub-convoy in which the follower vehicle is traveling, when the control unit determines the follower vehicle of the sub-convoy and identifies the convoy travel information received from the sub-convoy leader by the sub-convoy ID and the leader information included therein, and
   the control unit determines whether the follower vehicle of the sub-convoy is a wave blocker blocking a signal from the leader vehicle such that the convoy travel information from the leader vehicle is not reachable to a position of a rearmost vehicle in the sub-convoy, when the convoy travel information from the sub-convoy leader vehicle includes the current allowable number of vehicles indicating that the sub-convoy has space for a new vehicle, when the follower vehicle is determined to be the wave blocker, the control unit designates the follower vehicle as serving as a sub-convoy leader vehicle of a next sub-convoy and generates the convoy travel information to further include a content of serving as the sub-convoy leader vehicle.

3. The convoy travel apparatus of claim 1, wherein the control unit uses the convoy travel information received from a farthest forward leader vehicle for the convoy travel control of the new vehicle, when the new vehicle is (i) a vehicle outside of the convoy, joining a rear end of the convoy and (ii) receives the convoy travel information that includes the current allowable number of vehicles from multiple leader vehicles.

4. The convoy travel apparatus of claim 3, wherein the control unit uses the convoy travel information received from the farthest forward leader vehicle for the convoy travel control of the new vehicle from among many sets of the convoy travel information having a reception quality being equal to or above a predetermined standard received by the wireless communication unit.

5. The convoy travel apparatus of claim 1, wherein
the control unit transmits a convoy participation notice via the wireless communication unit to join a rear end of a convoy, when the new vehicle is a vehicle outside of the convoy, and
the control unit notifies the leader vehicle of the convoy in which the follower vehicle is traveling that the new vehicle has joined the convoy, when the follower vehicle receives a convoy participation notice after the control unit determines that the subject follower vehicle is the wave blocker and designates the follower vehicle as the representative leader of the convoy.

6. The convoy travel apparatus of claim 1, wherein the control unit determines that the follower vehicle is the wave blocker, when an out-of-convoy vehicle has not joined the convoy even when the wireless communication has been received including the convoy travel information from the out-of-convoy vehicle in an above-standard reception quality for at least a predetermined period of time.

7. The convoy travel apparatus of claim 1, wherein the convoy travel information includes information regarding a height of the follower vehicle, and
the control unit determines that the follower vehicle is the wave blocker when (i) the follower vehicle in the convoy, (ii) the follower vehicle is receiving the convoy travel information from a vehicle outside of the convoy in an above-standard reception quality, and (iii) the height of the follower vehicle is greater than the height of the vehicle outside of the convoy as provided in the convoy travel information received.

8. The convoy travel apparatus of claim 2, wherein the control unit uses the convoy travel information received from a farthest forward leader vehicle for the convoy travel control of the new vehicle, when the control unit determines that the new vehicle is (i) a vehicle outside of the convoy, joining a rear end of the convoy and (ii) receives the convoy travel information that includes the current allowable number of vehicles from multiple leader vehicles.

9. The convoy travel apparatus of claim 8, wherein the control unit uses the convoy travel information received from the farthest forward leader vehicle for the convoy travel control of the new vehicle from among many sets of the convoy travel information having a reception quality being equal to or above a predetermined standard received by the wireless communication unit.

* * * * *